United States Patent
Morgan et al.

(10) Patent No.: US 9,369,544 B1
(45) Date of Patent: Jun. 14, 2016

(54) TESTING COMPATIBILITY WITH WEB SERVICES

(71) Applicant: Google Inc., Mountain View, CA (US)

(72) Inventors: David Morgan, Zurich (CH); Christopher Semturs, Ottenbach (CH)

(73) Assignee: Google Inc., Mountain View, CA (US)

( * ) Notice: Subject to any disclaimer, the term of this patent is extended or adjusted under 35 U.S.C. 154(b) by 187 days.

(21) Appl. No.: 13/766,584

(22) Filed: Feb. 13, 2013

Related U.S. Application Data

(60) Provisional application No. 61/598,742, filed on Feb. 14, 2012.

(51) Int. Cl.
*G06F 15/16* (2006.01)
*H04L 29/06* (2006.01)
*G06F 11/36* (2006.01)
*H04L 29/08* (2006.01)

(52) U.S. Cl.
CPC ............ *H04L 67/42* (2013.01); *G06F 11/3672* (2013.01); *G06F 11/3684* (2013.01); *H04L 67/16* (2013.01)

(58) Field of Classification Search
CPC ........................ G06F 11/3672; G06F 11/3684
USPC ................... 709/203, 204, 217, 238
See application file for complete search history.

(56) References Cited

U.S. PATENT DOCUMENTS

| | | | |
|---|---|---|---|
| 7,302,492 B1* | 11/2007 | Day | 709/238 |
| 7,529,793 B2 | 5/2009 | Itoh et al. | |
| 7,620,700 B2* | 11/2009 | Matsushima | 709/219 |
| 7,689,646 B2* | 3/2010 | Bachmann et al. | 709/203 |
| 8,145,593 B2 | 3/2012 | Nayak et al. | |
| 8,275,855 B2 | 9/2012 | Kothari et al. | |
| 8,634,809 B1* | 1/2014 | Pfeffer | 455/412.2 |
| 2006/0248182 A1* | 11/2006 | Glassco et al. | 709/223 |
| 2007/0174420 A1 | 7/2007 | Khusial et al. | |
| 2008/0065402 A1* | 3/2008 | Sanamrad | 705/1 |
| 2008/0071597 A1* | 3/2008 | Chafle et al. | 705/8 |
| 2009/0089039 A1 | 4/2009 | Shufer et al. | |
| 2012/0143949 A1* | 6/2012 | Kumar | 709/204 |
| 2012/0246334 A1 | 9/2012 | Yang et al. | |

* cited by examiner

*Primary Examiner* — Aftab N. Khan
(74) *Attorney, Agent, or Firm* — Fish & Richardson P.C.

(57) ABSTRACT

Methods, systems, and apparatus, including computer programs encoded on a computer storage medium, for testing the compatibility of client devices with web services. In one aspect, a method includes receiving a request from a first client device; obtaining a response to the request from a web service, wherein the web service provides responses according to a web service schema that defines a plurality of possible response formats, and wherein the response conforms to a first response format of the plurality of possible response formats; selecting a second, different response format of the plurality of possible response formats defined by the web service schema; modifying the response to generate a modified response, wherein the modified response conforms to the second, different response format; and sending the modified response to the first client device.

27 Claims, 4 Drawing Sheets

TESTING COMPATIBILITY WITH WEB SERVICES

CROSS REFERENCE TO RELATED APPLICATION

This application claims the benefit under 35 U.S.C. §119 (e) of U.S. Patent Application No. 61/598,742, filed Feb. 14, 2012, entitled "Testing Compatibility With Web Services," which is incorporated by reference herein in its entirety.

BACKGROUND

This specification relates generally to testing the compatibility of client devices with web services.

Web services generally provide messages to client devices according to a schema that defines constraints for the content and structure of the response messages. For example, a web service can provide responses to requests received from client devices, with the responses satisfying the constraints specified by the schema for the web service. If a client device experiences a failure when processing a message received from the web service, the experience of a user of the client device may be undesirably affected.

SUMMARY

In general, one aspect of the subject matter described in this specification can be embodied in methods that include the actions of receiving a request from a first client device; obtaining a response to the request from a web service, wherein the web service provides responses according to a web service schema that defines a plurality of possible response formats, and wherein the response conforms to a first response format of the plurality of possible response formats; selecting a second, different response format of the plurality of possible response formats defined by the web service schema; modifying the response to generate a modified response, wherein the modified response conforms to the second, different response format; and sending the modified response to the first client device. These and other aspects can optionally include one or more of the following features.

The web service can be an XML service, and the web service schema can be an XML schema. Receiving a request from the first client device can include: intercepting a request transmitted by the first client device to the web service. The second response format can be pre-determined. Selecting the second response format can include: receiving data identifying the first client device and one or more modifications to be applied to the response; and selecting the second response format based on the one or more modifications.

The method can further include: providing a user interface to the a client device, wherein the user interface identifies a plurality of candidate modifications, wherein the plurality of candidate modifications includes the one or more modifications. The data identifying the one or more modifications can be received in response to a user input selecting one or more of the plurality of candidate modifications using the user interface. The method can further include: receiving data identifying that the modified response caused a failure at the first client device; and storing data associating the second response format and the data identifying that the second response format caused the failure at the first client device.

Selecting the second response format can include: determining that a previous modified response has been previously transmitted to the client device; identifying a third response format to which the previous modified response conformed; and selecting the second response format, wherein the second response format is different from both the first response format and the third response format. Modifying the response to generate the modified response can include at least one of: reordering a listing of elements included in the response, adding an element to a listing of elements included in the response, or removing an optional element from a listing of elements included in the response.

Particular embodiments of the subject matter described in this specification can be implemented so as to realize one or more of the following advantages. Clients of a web service can be effectively tested for compatibility with potential future changes made by the web service. Undesirable effects caused by modifications to the structure or content of messages sent to client devices by the web service can be minimized.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1 is a block diagram of an example system for testing the compatibility of a client device with a web service.

FIG. 2 is a diagram illustrating testing the compatibility of a client device with a web service.

FIG. 3 is a flow diagram of an example technique for testing the compatibility of a client device with a web service.

FIG. 4 is a flow diagram of an example technique for applying user-specified modifications to a response to a request.

Like reference numbers and designations in the various drawings indicate like elements.

DETAILED DESCRIPTION

FIG. 1 is a block diagram of an example system 100 for testing the compatibility of a client device with a web service. A user 102 can submit requests to a modification system 120 and a web service 130 through a client device 104. For example, the client device 104 can be a data processing apparatus coupled to the modification system 120 and the web service 130 through a network 110. The network 110 can be, for example, a local area network (LAN) or wide area network (WAN), e.g., the Internet. The client device 104 will generally include a random access memory (RAM) 106 and a processor 108. The client device 104 will also generally include a software application, e.g., a web browser or other communication software, to facilitate the sending and receiving of data over the network 110. The client device 104 can be, for example, a personal computer, a mobile communication device, or another device that can send and receive data over a network.

The web service 130 can be implemented as one or more data processing apparatus in one or more physical locations and provides responses to requests received from client devices, e.g., the client device 104. The web service can be, for example, an Extensible Markup Language (XML) service that communicates with client devices, e.g., client device 104, by providing XML messages in response to requests received from the client devices. An example XML service may be a video hosting service that allows mobile devices to search, upload, and watch videos using XML messages, e.g., through a software application installed on the mobile device.

Generally, the web service 130 receives requests from client devices and provides responses to the requests according to a web service schema, e.g., an XML schema, for the web service 130. The schema specifies requirements for requests that are submitted to the web service 130 and requirements for the format, e.g., the structure, the content or both, of responses to the requests issued by the web service. The client device 104 can be configured to send and receive messages to and from the web service 130 over the network 110 by virtue of a software application installed on the client device 104 that submits messages to the web service 130 that satisfy the schema and processes responses to the requests received from the web service 130 based on the schema. For example, the schema can specify one or more of: the types of elements that are to be included in each response, ranges for the number of elements of each type that are to be included in each response, the ordering of the elements, the elements that are required to be included in each response, the elements that are optional in any given response, and so on.

The modification system 120 can be used to test the compatibility of the client device 104 with messages that satisfy the requirements of the schema but are different in format from messages being issued by the web service 130, e.g., to account for potential future modifications to the responses generated by the web service 130. The modification system 120, which can be implemented as one or more data processing apparatus in one or more physical locations, can receive a request from the client device 104, modify the response to the request generated by the web service 130, and send the modified response to the client device 104. In some implementations, the modification system 120 intercepts requests sent by the client device 104 that are intended for the web service 130. Alternatively, the client device 104 can be configured to address messages intended for the web service 130 to the modification system 120. Modifying requests will be described in more detail below with reference to FIGS. 2-4.

Figure 2:
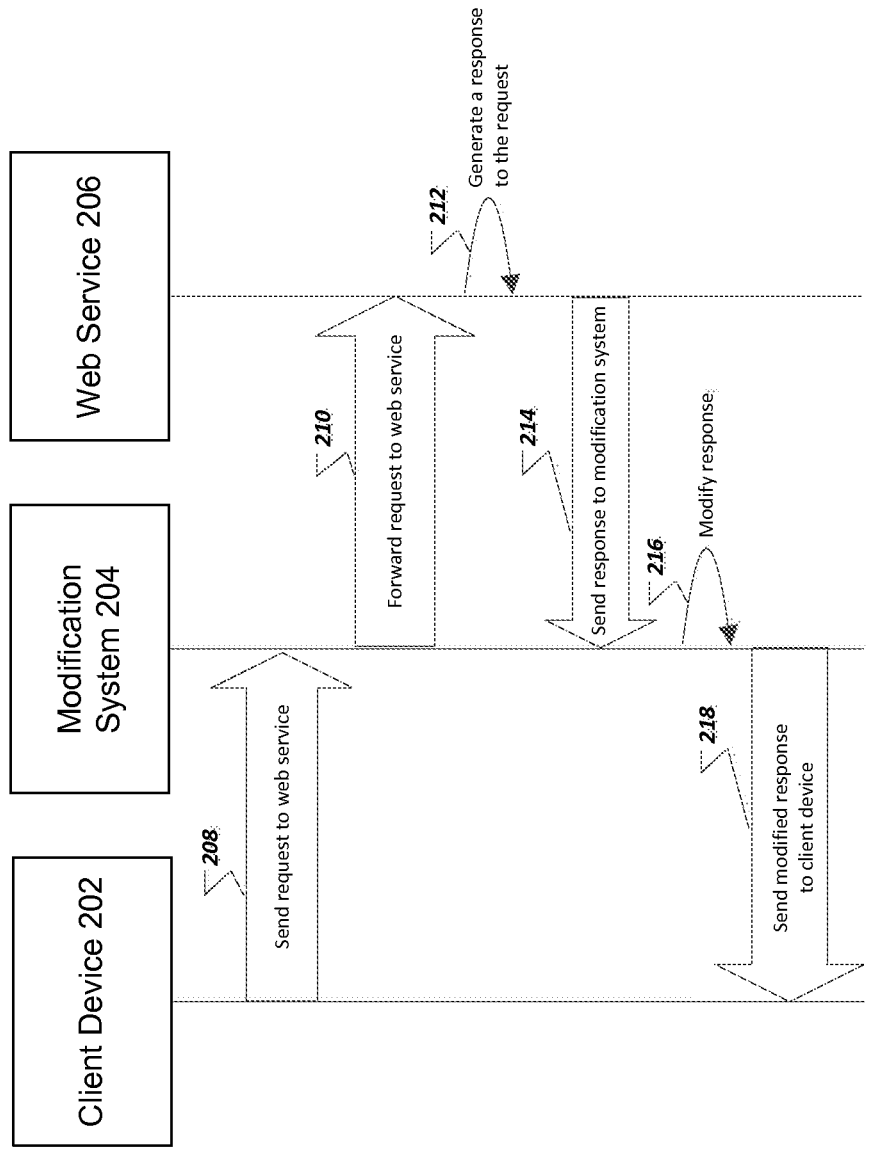

FIG. 2 is a diagram illustrating testing the compatibility of a client device with a web service.

By way of example, a client device 202 sends a request 208 to a modification system 204. For example, the request can be addressed to the modification system 204. That is, if a web service 206 has an address of webservice.com and the modification system 204 has an address of test.webservice.com, when a user of the client device 202 desires to test the compatibility of the client device with potential future modifications to responses issued by the web service 206, the user can configure the client device 202 to address requests to test.webservice.com rather than to webservice.com. Alternatively, the modification system 204 can intercept a request addressed to a web service 206, e.g., the modification system 206 can intercept some or all of the messages addressed to webservice.com.

The modification system 204 forwards the request 210 to the web service 206. The web service 206 generates a response 212 to the request. The response conforms to a first response format that satisfies a schema for the web service. The schema defines requirements for responses submitted to the web service 206 and requirements for the format, e.g., the structure, the content, or both, of responses to requests issued by the web service 206. However, there may be many response formats that satisfy the criteria for structure and content specified by the schema, e.g., because many different permutations of elements, types of elements, orders of elements, and so on, may satisfy the requirements of the schema. Thus, although the request is formatted according to a first response format, there may be many other, different response formats that also satisfy each criterion of the schema. For example, a response formatted according to a first response format may include four elements of a particular type. However, the schema may specify, in part, that a response can include four, five, or six elements of the type. Thus, responses formatted according to alternative response formats that include five or six elements of the type would also satisfy the requirements of the schema.

The web service 206 sends the response 214 to the modification system 204. Once the response is received, the modification system 204 modifies the response 216. In order to modify the response, the modification system 204 selects a second response format that differs from the first response format but still satisfies the schema.

In some implementations, the second response format is be pre-determined, e.g., by a system administrator, so that the same response format is selected for each response received by the modification system 204. Alternatively, a user can interact with the modification system 204 over a network, e.g., through a user interface provided by the modification system 204, to select a set of modifications that are to be applied to a particular request. Users interacting with the modification system to select the set of modifications that is applied to a request will be described in more detail below with reference to FIG. 4.

In some implementations, the modification system 204 selects a second response format that has not already been used with the client device 204. For example, the modification system 204 can determine whether it has previously received one or more requests from the client device 202, e.g., based on an Internet Protocol (IP) address of the client device or on a cookie stored on the client device and transmitted with the request. If the modification system 204 has previously received one or more requests from the client device 202, the modification system 204 can identify the response formats for each modified response that the modification system 204 has transmitted to the client device 202. The modification system 204 can then automatically select a response format for the response that is different from both the first response format and the response formats selected for the previous responses to requests submitted by the client device 202. If the modification system 204 has not previously received a request from the client device 204, the modification system 204 can select, e.g., a pre-determined second format that has caused failures at other client devices.

For example, the second response format can differ from the first response format in that it changes the number of elements in the response to a different number permitted by the schema, removes a type of element that is defined by the schema as being optional, re-orders the elements in the response to another order permitted by the schema, and so on. For example, if the web service is a service that identifies videos that match search queries received from client devices, the second response format can alter the number of video thumbnails included in the response, change the order of the attributes that describe the video thumbnails, and so on.

The modification system 204 then modifies the response so that it conforms to the second response format rather than the first response format. Thus, the modified response is a response that satisfies the requirements of the schema but is distinct from the response that would typically have been received by the client device 204 for a request submitted to the web service 206.

The modification system 204 sends the modified response 218 to the client device 202. Because the modified response is formatted differently from a typical response received from the web service 206, the modified response may adversely affect the experience of a user of the client device 202, i.e., cause a failure at the client device 202. For example, the modified response may not be displayed properly on a user interface of the client device 202, the modified response may cause an application installed on the client device 202 that communicates with the web service 206 to unexpectedly crash, and so on. However, because the modified response satisfies the requirements for responses to the web service 206, issues caused by the modified response may be indicative of future problems if the format of responses received from the web service 206 changes. Thus, a user of the client device 202, e.g., a developer of a software application installed on the client device 202 that communicates with the web service 206, can troubleshoot problems that may arise if changes are made to the responses issued by the web service 206 in the future.

Figure 3:
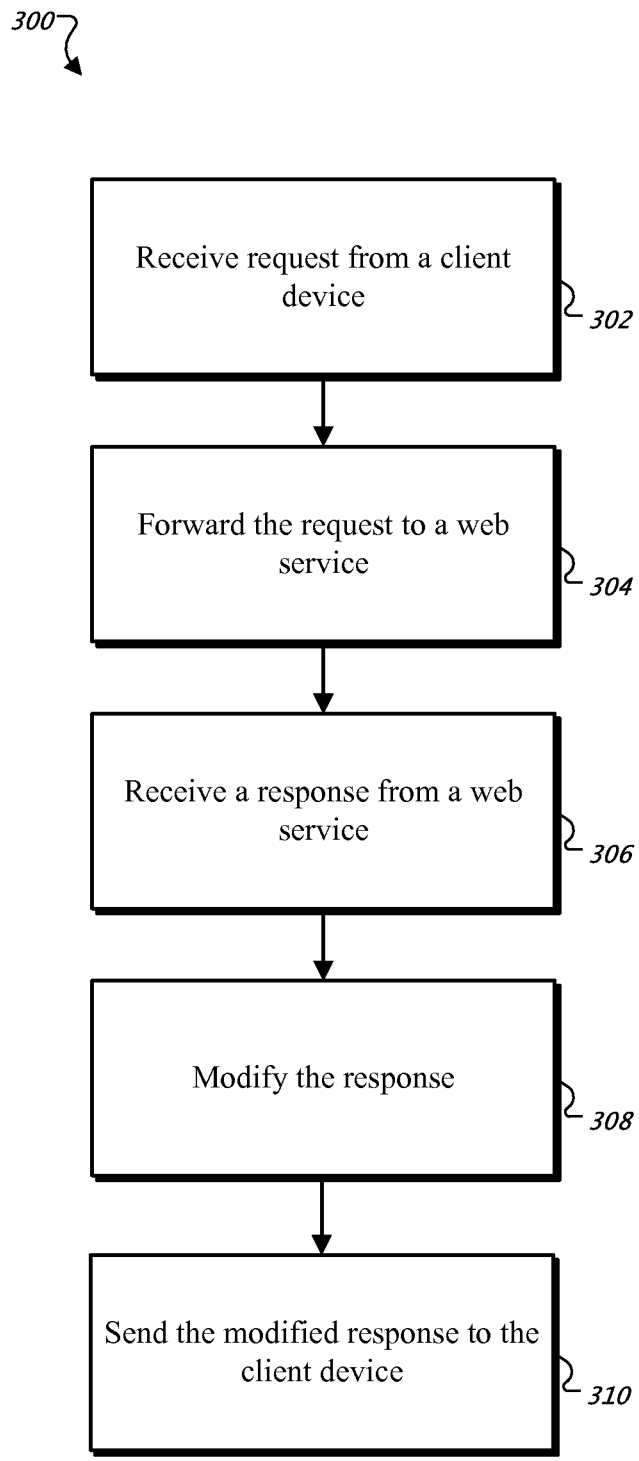

FIG. 3 is a flow diagram of an example technique 300 for testing the compatibility of a client device with a web service. For convenience, the technique 300 will be described with respect to a system of data processing apparatus located in one or more locations that performs the technique 300. For example, a modification system, e.g., modification system 120 of FIG. 1, can be used to perform the technique 300.

The system receives 302 a request from a client device. The system obtains 304 a response to the request from the web service that conforms to a first response format that satisfies a schema for the web service. The system selects 306 a different, second response format. The system modifies 308 the response so that the modified response conforms to the second response format. The system sends 310 the modified response to the client device.

In some implementations, instead of selecting the same second response format for each response, the system can select the second response format based on user input. For example, a user desiring to test the compatibility of a particular client device can select how a response intended for the client device is to be modified using a user interface provided by the system.

Figure 4:
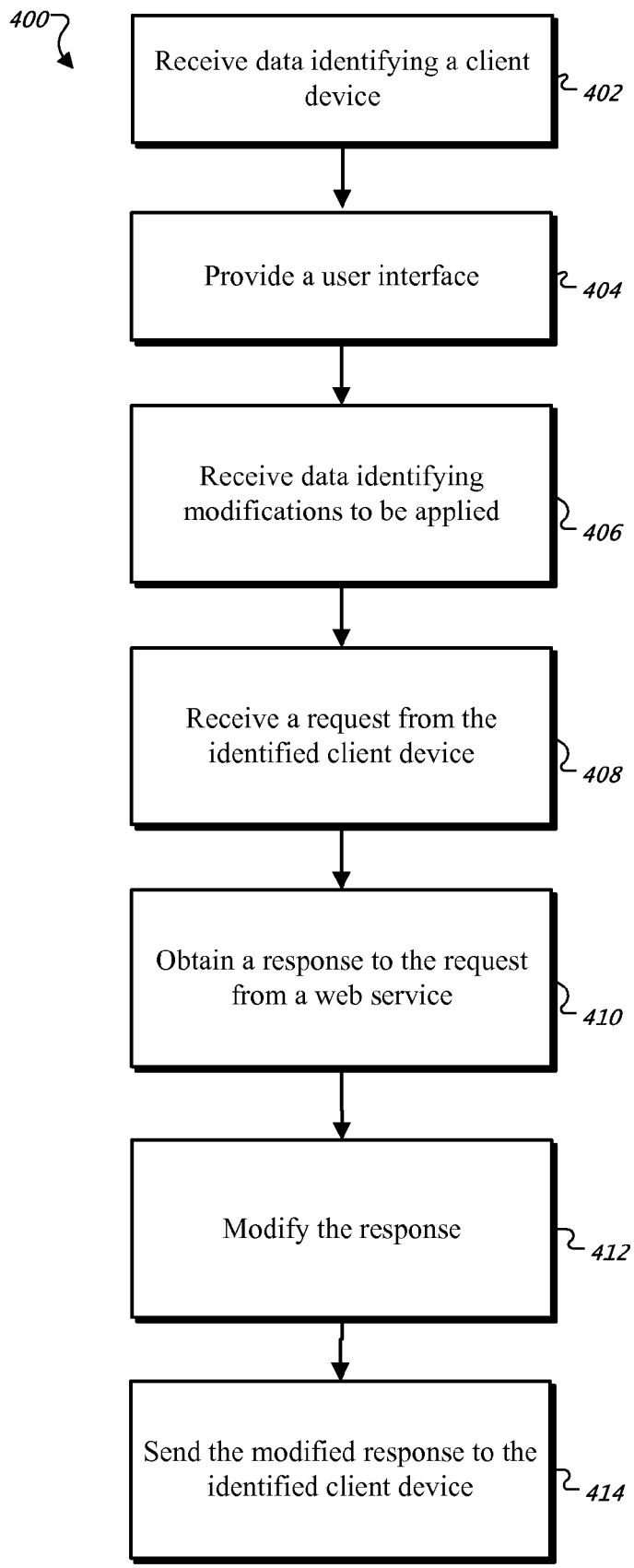

FIG. 4 is a flow diagram of an example technique 400 for applying user-specified modifications to a response to a request. For convenience, the technique 400 will be described with respect to a system of data processing apparatus located in one or more locations that performs the technique 400. For example, a modification system, e.g., modification system 120 of FIG. 1, can be used to perform the technique 400.

The system receives 402 data identifying a client device. For example, the received data can include one or more of the Internet Protocol (IP) address of the client device and a user identifier of a user that is associated with a particular client device.

The system provides 404 a user interface that allows a user to specify the modifications that are to be applied to a response to requests received from the identified client device. The system can provide the user interface to the identified client device or a different client device. The user interface can present potential modifications to a user and allow the user to submit inputs selecting one or more of the potential modifications. Each potential modification, when applied to a response generated by a web service, modifies the response such that the modified response conforms to a response format that is different from the response format of responses issued by the web service but still satisfies a schema that identifies requirements for the format of responses issued by the web service.

In some implementations, the user interface can also present information identifying previous responses transmitted to the identified client device and which modifications of the possible modifications were applied to those responses. For each previous response, the user interface can allow the user to submit an input identifying whether the modifications to the response caused a failure at the client device, e.g., whether the modifications undesirably affected the experience of a user of the identified client device, or not.

The system receives 406 data identifying one or more modifications that are to be applied to a response to the next request received from the identified client device. In some implementations, the identified modifications are to be applied only to the response to the next request received from the device. Alternatively, the modifications can be applied to a pre-determined number of next requests or to each subsequent request until the system receives data identifying a different set of modification that are to be applied to responses to requests received from the identified client device.

The system receives 408 a request from the identified client device. The system obtains 410 a response to the request from the web service. The response is generated by the web service in accordance with a first response format that satisfies the schema for the web service.

The system modifies 412 the response based on the modifications identified by the user input. That is, the system applies the modifications identified by the user to generate a modified response that conforms to a second response format that satisfies the requirements of the schema but is different from the first response format.

The system sends 414 the modified response to the identified client device. Once the response is received by the client device, the user may determine whether the modifications have adversely affected the user experience. If the modifications have caused a failure at the client device, e.g., undesirably affected the user experience of a user of the identified client device, the user may submit another input through the user interface provided by the system that modifies the modifications to identify the modification that caused the changes. For example, if the user had previously selected more than one modification to be applied, the user may submit an input removing one or more of the previously-selected modifications in an attempt to identify the previously-selected modification that was problematic. The user can therefore iteratively adjust the modifications applied to identify the particular modification or modifications that cause the failures. If the modifications did not undesirably affect the user experience, the user can submit an input through the user interface that indicates that the selected modifications were successful. Thus, the user can interact with the system through the user interface provided by the system to troubleshoot any problems caused by modifications that may be applied to responses generated by the web service in the future.

While the above description describes modifying a response so that it conforms to a different response format that still satisfies the requirements of a schema, the system can also modify responses in accordance with additional requirements imposed by the web service, e.g., requirements that are independent of the schema for the web service. For example, a web service may specify requirements for clients of the service that are independent of the schema for the web service and that define how data provided to the clients in responses issued by the web service is allowed to be used. The system can modify the data provided in a response to ensure that clients are conforming to these additional requirements.

For example, a web service may return, as part of a response, one or more links to other components hosted by the service. The service may require that clients navigate those returned links to access those components of the service, e.g., rather than accessing those components using links to the components that are stored locally on the client device or hardcoded into the software program executing on the client device that interacts with the web service, so that changes to the addresses of the identified components do not cause a failure at the client.

In these circumstances, the system can, in addition to or instead of modifying requirements of the web service schema, modify one or more of the links included in the response. When the system receives a request that attempts to access a component by following a modified link, the system can revert the link back to the proper form to ensure that no failures are caused at the client device. Alternatively, when the system receives a request that attempts to access a component using the correct address, e.g., because the client device used a stored address rather than following the modified link included in the response, the system can alter the response to cause a failure at the client device or otherwise indicate to a user of the client device that a potential problem exists.

As another example, the service may specify that particular pieces of data provided in a response can only be used by a client in certain circumstances. The system can modify these pieces of data to ensure that, if the client uses that information in an unauthorized manner, a failure is experienced at the client device.

Figure 1:
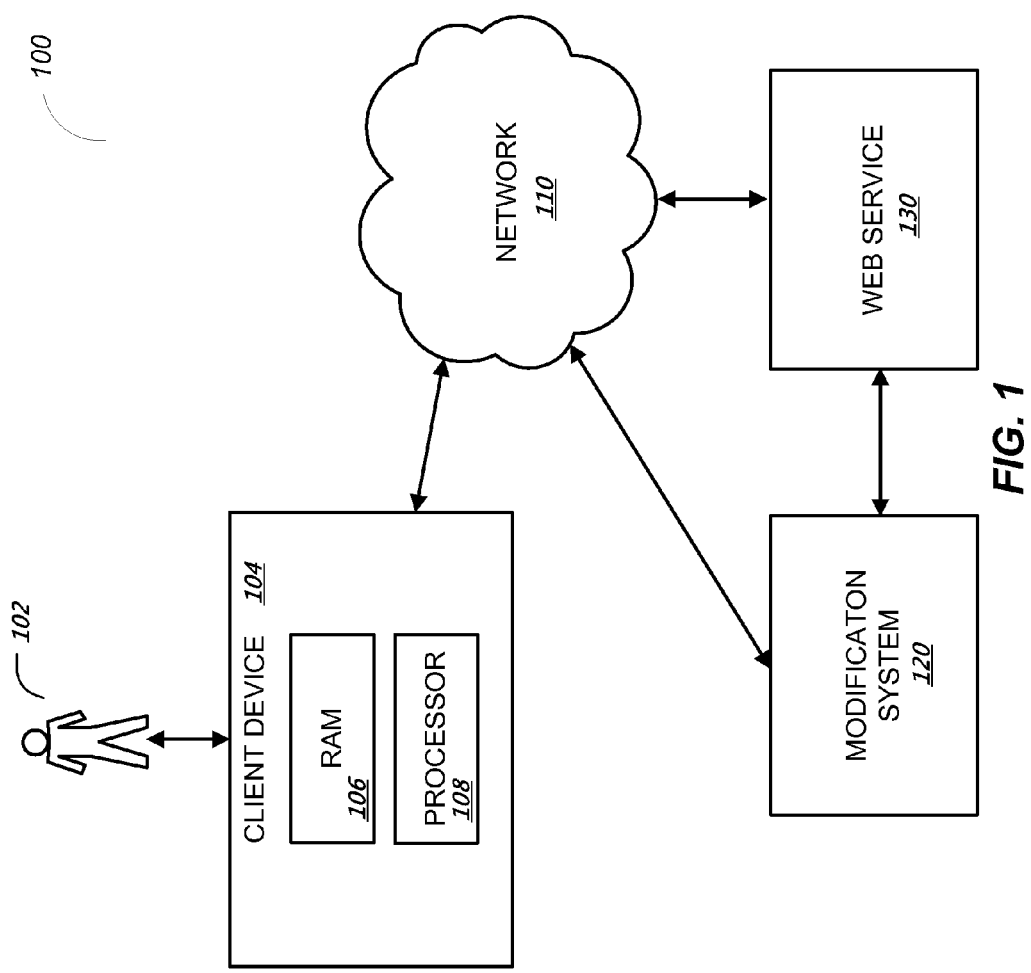

Additionally, while the above description describes a modification system, e.g., the modification system 120 of FIG. 1 and the modification system 204 of FIG. 2, as being independent from the web service from which the system receives responses, in some implementations, the functionality of the modification system can be performed by the web service. In these implementations, when the web service receives a request from a client device, the web service can determine whether to issue a modified response to the request based on whether an identifier of the client device matches an identifier in a data set of identifiers of client devices to which modified responses are to be issued, on a specified parameter included in the request, or both. For example, the data set can include IP address that have been e.g., provided to the system by users or specified by a system administrator. If a request is received from a client device having an IP address that matches one of the IP addresses in the data set, the system can determine to transmit a modified response to the client device. Alternatively, the request may include a specified parameter, e.g., an HTML header, that indicates to the system that a modified response should be issued in response to the request. In some implementations, the system only issues a modified response if the identifier of the client device submitting the request matches an identifier in the data set and the request includes the specified parameter.

Embodiments of the subject matter and the operations described in this specification can be implemented in digital electronic circuitry, or in computer software, firmware, or hardware, including the structures disclosed in this schema and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving a request from a first client device;
   obtaining an original response to the request from a web service, wherein the web service provides responses according to a web service schema that specifies requirements for the format of the responses provided by the web service, wherein the requirements are satisfied by a plurality of possible response formats, wherein the original response conforms to a first response format of the plurality of possible response formats that satisfy the requirements specified by the web service schema, wherein the web service is an Extensible Markup Language (XML) service, and wherein the web service schema is an XML schema;
   selecting a second, different response format of the plurality of possible response formats that each satisfy the requirements for responses specified by the web service schema for responses provided by the web service, wherein selecting the second, different response format comprises selecting a response format that (i) is different from both the first response format and from one or more response formats selected for one or more previous responses to requests received from the first client device and (ii) satisfies the requirements for responses specified by the web service schema;
   modifying the original response so that it conforms to the second, different response format instead of the first response format to generate a modified response, wherein both the original response and the modified response satisfy the requirements specified by the web service schema for responses provided by the web service; and
   sending the modified response to the first client device in place of the original response.

2. The method of claim 1, wherein receiving a request from the first client device comprises:
intercepting a request transmitted by the first client device to the web service.

3. The method of claim 1, wherein the second response format is pre-determined.

4. The method of claim 1, wherein selecting the second response format comprises:
determining that a previous modified response has been previously transmitted to the client device;
identifying a third response format to which the previous modified response conformed; and
selecting the second response format, wherein the second response format is different from both the first response format and the third response format.

5. The method of claim 1, wherein modifying the original response to generate the modified response comprises at least one of: reordering a listing of elements included in the original response, adding an element to a listing of elements included in the original response, or removing an optional element from a listing of elements included in the original response.

6. The method of claim 1, wherein selecting the second response format comprises:
receiving data identifying the first client device and one or more modifications to be applied to the original response; and
selecting the second response format based on the one or more modifications.

7. The method of claim 6, further comprising:
providing a user interface to a client device, wherein the user interface identifies a plurality of candidate modifications, wherein the plurality of candidate modifications includes the one or more modifications.

8. The method of claim 7, wherein the data identifying the one or more modifications is received in response to a user input selecting one or more of the plurality of candidate modifications using the user interface.

9. The method of claim 8, further comprising:
receiving data identifying that the modified response caused a failure at the first client device; and
storing data associating the second response format and the data identifying that the second response format caused the failure at the first client device.

10. A system comprising data processing apparatus and a storage medium encoded with instructions which, when executed by the data processing apparatus, cause the data processing apparatus to perform operations comprising:
receiving a request from a first client device;
obtaining an original response to the request from a web service, wherein the web service provides responses according to a web service schema that specifies requirements for the format of the responses provided by the web service, wherein the requirements are satisfied by a plurality of possible response formats, wherein the original response conforms to a first response format of the plurality of possible response formats that satisfy the requirements specified by the web service schema, wherein the web service is an Extensible Markup Language (XML) service, and wherein the web service schema is an XML schema;
selecting a second, different response format of the plurality of possible response formats that each satisfy the requirements for responses specified by the web service schema for responses provided by the web service, wherein selecting the second, different response format comprises selecting a response format that (i) is different from both the first response format and from one or more response formats selected for one or more previous responses to requests received from the first client device and (ii) satisfies the requirements for responses specified by the web service schema;
modifying the original response so that it conforms to the second, different response format instead of the first response format to generate a modified response, wherein both the original response and the modified response satisfy the requirements specified by the web service schema for responses provided by the web service; and
sending the modified response to the first client device in place of the original response.

11. The system of claim 10, wherein receiving a request from the first client device comprises:
intercepting a request transmitted by the first client device to the web service.

12. The system of claim 10, wherein the second response format is pre-determined.

13. The system of claim 10, wherein selecting the second response format comprises:
determining that a previous modified response has been previously transmitted to the client device;
identifying a third response format to which the previous modified response conformed; and
selecting the second response format, wherein the second response format is different from both the first response format and the third response format.

14. The system of claim 10, wherein modifying the original response to generate the modified response comprises at least one of: reordering a listing of elements included in the original response, adding an element to a listing of elements included in the original response, or removing an optional element from a listing of elements included in the original response.

15. The system of claim 10, wherein selecting the second response format comprises:
receiving data identifying the first client device and one or more modifications to be applied to the original response; and
selecting the second response format based on the one or more modifications.

16. The system of claim 15, the operations further comprising:
providing a user interface to a client device, wherein the user interface identifies a plurality of candidate modifications, wherein the plurality of candidate modifications includes the one or more modifications.

17. The system of claim 16, wherein the data identifying the one or more modifications is received in response to a user input selecting one or more of the plurality of candidate modifications using the user interface.

18. The system of claim 17, the operations further comprising:
receiving data identifying that the modified response caused a failure at the first client device; and
storing data associating the second response format and the data identifying that the second response format caused the failure at the first client device.

19. A non-transitory storage medium encoded with instructions which, when executed by data processing apparatus, cause the data processing apparatus to perform operations comprising:
receiving a request from a first client device;
obtaining an original response to the request from a web service, wherein the web service provides responses according to a web service schema that specifies requirements for the format of the responses provided by the web service, wherein the requirements are satisfied by a plurality of possible response formats, wherein the original response conforms to a first response format of the plurality of possible response formats that satisfy the requirements specified by the web service schema, wherein the web service is an Extensible Markup Language (XML) service, and wherein the web service schema is an XML schema;

selecting a second, different response format of the plurality of possible response formats that each satisfy the requirements for responses specified by the web service schema for responses provided by the web service, wherein selecting the second, different response format comprises selecting a response format that (i) is different from both the first response format and from one or more response formats selected for one or more previous responses to requests received from the first client device and (ii) satisfies the requirements for responses specified by the web service schema;

modifying the original response so that it conforms to the second, different response format instead of the first response format to generate a modified response, wherein both the original response and the modified response satisfy the requirements specified by the web service schema for responses provided by the web service; and sending the modified response to the first client device in place of the original response.

20. The non-transitory storage medium of claim 19, wherein receiving a request from the first client device comprises:
intercepting a request transmitted by the first client device to the web service.

21. The non-transitory storage medium of claim 19, wherein
the second response format is pre-determined.

22. The non-transitory storage medium of claim 19, wherein selecting the second response format comprises:

determining that a previous modified response has been previously transmitted to the client device;
identifying a third response format to which the previous modified response conformed; and
selecting the second response format, wherein the second response format is different from both the first response format and the third response format.

23. The non-transitory storage medium of claim 19, wherein modifying the original response to generate the modified response comprises at least one of: reordering a listing of elements included in the original response, adding an element to a listing of elements included in the original response, or removing an optional element from a listing of elements included in the original response.

24. The non-transitory storage medium of claim 19, wherein selecting the second response format comprises:
receiving data identifying the first client device and one or more modifications to be applied to the original response; and
selecting the second response format based on the one or more modifications.

25. The non-transitory storage medium of claim 24, the operations further comprising:
providing a user interface to a client device, wherein the user interface identifies a plurality of candidate modifications, wherein the plurality of candidate modifications includes the one or more modifications.

26. The non-transitory storage medium of claim 25, wherein the data identifying the one or more modifications is received in response to a user input selecting one or more of the plurality of candidate modifications using the user interface.

27. The non-transitory storage medium of claim 26, the operations further comprising:
receiving data identifying that the modified response caused a failure at the first client device; and
storing data associating the second response format and the data identifying that the second response format caused the failure at the first client device.

\* \* \* \* \*